United States Patent [19]

Sekhar

[11] Patent Number: 5,374,342
[45] Date of Patent: Dec. 20, 1994

[54] PRODUCTION OF CARBON-BASED COMPOSITE MATERIALS AS COMPONENTS OF ALUMINIUM PRODUCTION CELLS

[75] Inventor: Jainagesh A. Sekhar, Cincinnati, Ohio

[73] Assignee: Moltech Invent S.A., Luxembourg

[21] Appl. No.: 34,276

[22] Filed: Mar. 22, 1993

[51] Int. Cl.$^5$ .............................................. C25C 3/08
[52] U.S. Cl. ............................ 204/243 R; 204/279; 204/290 R; 204/291
[58] Field of Search ................ 204/243 R, 279, 280, 204/290 R, 291

[56] References Cited

U.S. PATENT DOCUMENTS

| | | | |
|---|---|---|---|
| 3,090,094 | 5/1963 | Schwartzwalder et al. | 25/156 |
| 3,097,930 | 7/1963 | Holland | 25/156 |
| 3,111,396 | 11/1963 | Ball | 25/156 |
| 3,345,440 | 10/1967 | Googin et al. | 264/29 |
| 3,705,791 | 12/1972 | Bredzs | 29/195 |
| 3,726,643 | 4/1973 | Merzhanov et al. | 423/409 |
| 3,778,249 | 12/1973 | Benjamin et al. | 25/0.5 BC |
| 3,893,917 | 7/1975 | Pryor et al. | 210/69 |
| 3,947,363 | 3/1976 | Pryor et al. | 210/510 |
| 3,962,081 | 6/1976 | Yarwood et al. | 210/69 |
| 4,024,056 | 5/1977 | Yarwood et al. | 210/69 |
| 4,081,371 | 3/1978 | Yarwood et al. | 210/69 |
| 4,217,948 | 8/1980 | Merzhanov et al. | 164/115 |
| 4,257,810 | 3/1981 | Narumiya | 106/42 |
| 4,258,099 | 3/1981 | Narumiya | 428/311 |
| 4,308,113 | 12/1981 | Das | 204/67 |
| 4,374,761 | 2/1983 | Ray | 252/519 |
| 4,391,918 | 7/1983 | Brockmeyer | 501/127 |
| 4,405,433 | 9/1983 | Payne | 204/225 |
| 4,455,211 | 6/1984 | Ray et al. | 204/293 |
| 4,459,363 | 7/1984 | Holt | 501/96 |
| 4,596,637 | 6/1986 | Kozarek et al. | 204/67 |
| 4,600,481 | 7/1986 | Sane et al. | 204/67 |
| 4,650,552 | 3/1987 | de Nora et al. | 204/243 R |
| 4,678,548 | 7/1987 | Brown | 204/67 |
| 4,678,760 | 7/1987 | Ray | 204/291 |
| 4,680,094 | 7/1987 | Duruz | 204/67 |
| 4,697,632 | 10/1987 | Lirones | 164/369 |
| 4,699,763 | 10/1987 | Sinharoy et al. | 419/11 |
| 4,710,348 | 12/1987 | Brupbacher et al. | 420/129 |
| 4,747,873 | 5/1988 | Kamioka | 75/229 |

(List continued on next page.)

FOREIGN PATENT DOCUMENTS

| | | |
|---|---|---|
| 0126555 | 11/1984 | European Pat. Off. . |
| 0192602 | 8/1986 | European Pat. Off. . |
| 1173804 | 3/1959 | France . |

OTHER PUBLICATIONS

J. W. McCauley et al. "Simultaneous Preparation ...", Ceramic Engineering, 3 (1982), pp. 538–554.

R. W. Rice et al., "Effects of Self-Propagating ..." Ceramic Engineering, 7 (1986), pp. 737–749.

H. C. Yi, Journal Materials Science, 25 (1990) pp. 1159–1168.

C. H. Samans "Powder Metallurgy", American Society For Metals, Metals Handbook, 1948, pp. 47–52.

Primary Examiner—Kathryn Gorgos
Attorney, Agent, or Firm—Frost & Jacobs

[57] ABSTRACT

A method of producing a component of an aluminium production cell made of a carbon-based composite material containing a refractory hard metal boride, carbide, oxide, nitride or combinations or mixtures thereof and aluminium as metal, alloy or as an aluminium compound, comprises firstly providing a reaction mixture of aluminium and precursors which react to form the refractory hard metal compound, and optional fillers and additives. The reaction mixture is mixed with particulate carbon in an amount of from 1 to 20 parts by weight of carbon for 1 part by weight of the reaction mixture; and with a colloidal binder containing at least one of colloidal silica, alumina, yttria, ceria, thoria, zirconia, magnesia, lithia, in an amount to fully wet the carbon particles. The resulting mixture is compacted and dried and heated to initiate reaction of the reaction mixture by self-propagating micropyretic reaction.

5 Claims, No Drawings

U.S. PATENT DOCUMENTS

| | | | |
|---|---|---|---|
| 4,751,048 | 6/1988 | Christodoulou et al. | |
| 4,772,452 | 9/1988 | Brupbacher et al. | 420/129 |
| 4,774,052 | 9/1988 | Nagle et al. | 420/129 |
| 4,800,065 | 1/1989 | Christodoulou et al. | 420/129 |
| 4,808,372 | 2/1989 | Koczak et al. | 420/457 |
| 4,836,982 | 6/1989 | Brupbacher et al. | 420/129 |
| 4,865,701 | 9/1989 | Beck et al. | 204/67 |
| 4,900,698 | 2/1990 | Lundsager | 501/80 |
| 4,902,457 | 2/1990 | Wada et al. | 264/43 |
| 4,904,424 | 2/1990 | Johnson | 264/566 |
| 4,909,842 | 3/1990 | Dunmead et al. | 75/236 |
| 4,915,903 | 4/1990 | Brupbacher et al. | 429/128 |
| 4,915,905 | 4/1990 | Kampe et al. | 420/418 |
| 4,948,676 | 8/1990 | Darracq et al. | 428/539 |
| 4,948,761 | 8/1990 | Hida | 501/89 |
| 4,957,885 | 9/1990 | Hida | 501/89 |
| 4,961,778 | 10/1990 | Pyzik et al. | 75/230 |
| 4,965,044 | 10/1990 | Miyamoto et al. | 419/12 |
| 4,975,191 | 12/1990 | Brockmeyer et al. | 210/510 |
| 4,985,202 | 1/1991 | Moshier et al. | 420/590 |
| 4,988,480 | 1/1991 | Merzhanov et al. | 419/11 |
| 4,990,295 | 2/1991 | Hida | 264/65 |
| 5,006,290 | 4/1991 | Hida | 264/65 |
| 5,015,343 | 5/1991 | LaCamera et al. | 204/67 |
| 5,022,991 | 6/1991 | Day et al. | 210/506 |
| 5,030,600 | 7/1991 | Hida et al. | 501/98 |
| 5,032,332 | 7/1991 | Hida et al. | 214/65 |
| 5,071,533 | 12/1991 | de Nora et al. | 204/243 |
| 5,071,797 | 12/1991 | Hida | 501/87 |
| 5,143,668 | 9/1992 | Hida | 264/63 |
| 5,145,619 | 9/1992 | Abramovici | 264/60 |
| 5,149,677 | 9/1992 | Merzhanov et al. | 501/96 |
| 5,158,655 | 10/1992 | Townsend | 204/67 |
| 5,188,678 | 2/1993 | Sekhar et al. | 148/514 |
| 5,217,583 | 6/1993 | Sekhar et al. | 204/67 |

PRODUCTION OF CARBON-BASED COMPOSITE MATERIALS AS COMPONENTS OF ALUMINIUM PRODUCTION CELLS

FIELD OF THE INVENTION

The invention relates to components of aluminium production cells made of carbon-based composite materials containing refractory hard metal borides, carbides, oxides, nitrides, or combinations or mixtures thereof, and at least one aluminium-based component selected from aluminium metal, aluminium alloys and aluminium compounds, and is particularly concerned with improved methods of producing such components.

BACKGROUND OF THE INVENTION

Aluminium is produced conventionally by the Hall-Héroult process, by the electrolysis of alumina dissolved in a cryolite-based molten electrolyte at temperatures around 950° C. A Hall-Héroult reduction cell typically has a steel shell provided with an insulating lining of refractory material, which in turn has a lining of carbon which contacts the molten constituents. Conductor bars connected to the negative pole of a direct current source are embedded in the carbon cathode blocks forming the cell bottom floor. The cathode blocks are usually made of an anthracite based prebaked carbon material containing coal tar pitch as a binder joined with a ramming paste mixture of anthracite, coke, and coal tar.

In Hall-Héroult cells, a molten aluminium pool above the carbon blocks acts as the cathode where the reduction to aluminium takes place. The carbon lining or cathode material has a normal useful life of three to eight years, or even less under adverse conditions. The deterioration of the cathode bottom is due to erosion and penetration of electrolyte and liquid aluminium as well as intercalation by sodium, which causes swelling and deformation of the cathode carbon blocks and ramming paste. In addition, the penetration of sodium species and other ingredients of cryolite or air leads to the formation of toxic compounds including cyanides.

Difficulties in operation also arise from the accumulation of undissolved alumina sludge on the surface of the carbon cathode blocks beneath the aluminium pool which forms insulating regions on the cell bottom. Penetration of cryolite and aluminium through the carbon and the deformation of the cathode carbon blocks also cause displacement of such cathode blocks. Due to displacement of the cathode blocks, aluminium reaches the steel cathode conductor bars causing corrosion thereof leading to deterioration of the electrical contact and an excessive iron content in the aluminium metal produced.

Extensive research has been carried out with Refractory Hard Metals (RHM) such as $TiB_2$ as cathode materials. $TiB_2$ and other RHM's are practically insoluble in aluminium, have a low electrical resistance, and are wetted by aluminium. This should allow aluminium to be electrolytically deposited directly on an RHM cathode surface, and should avoid the necessity for a deep aluminium pool. Because titanium diboride and similar Refractory Hard Metals are wettable by aluminium, resistant to the corrosive environment of an aluminium production cell, and are good electrical conductors, numerous cell designs utilizing Refractory Hard Metal have been proposed, which would present many advantages, notably including the saving of energy by reducing the anode cathode distance.

The use of titanium diboride and other RHM current-conducting elements in electrolytic aluminium production cells is described in U.S. Pat. Nos. 2,915,442, 3,028,324, 3,215,615, 3,314,876, 3,330,756, 3,156,639, 3,274,093 and 3,400,061. Despite extensive efforts and the potential advantages of having surfaces of titanium diboride at the cell cathode bottom, such propositions have not been commercially adopted by the aluminium industry.

Various types of $TiB_2$ or RHM layers applied to carbon substrates have failed due to poor adherence and to differences in thermal expansion coefficients between the titanium diboride material and the carbon cathode block.

U.S. Pat. No. 3,400,061 describes a cell without an aluminium pool but with a drained cathode of Refractory Hard Metal which consists of a mixture of Refractory Hard Metal, at least 5 percent carbon, and 10 to 20% by weight of pitch binder, baked at 900° C. or more and rammed into place in the cell bottom. Such composite cathodes have found no commercial use probably due to susceptibility to attack by the electrolytic bath.

U.S. Pat. No. 3,661,736 claims a composite drained cathode for an aluminium production cell, comprising particles or pieces of arc-melted "RHM alloy" embedded in an electrically conductive matrix of carbon or graphite and a particulate filler such as aluminium carbide, titanium carbide or titanium nitride. However, in operation, grain boundaries and the carbon or graphite matrix are attacked by electrolyte and/or aluminium, leading to rapid destruction of the cathode.

U.S. Pat. No. 4,308,114 discloses a cathode surface of RHM in a graphitic matrix made by mixing the RHM with a pitch binder and graphitizating at 2350° C. or above. Such cathodes are subject to early failure due to rapid ablation, and possible intercalation by sodium and erosion of the graphite matrix.

U.S. Pat. No. 4,466,996 proposed applying a coating composition comprising a pre-formed particulate RHM, such as $TiB_2$, a thermosetting binder, a carbonaceous filler and carbonaceous additives to a carbonaceous cathode substrate, followed by curing and carbonisation. But it was still not possible by this method to obtain coatings of satisfactory adherence that could withstand the operating conditions in an aluminium production cell.

U.S. Pat. No. 4,595,545 discloses the production of titanium diboride or a mixture thereof with a carbide and/or a nitride of titanium, zirconium, hafnium, vanadium, niobium, tantalum, chromium, molybdenum or tungsten by carbothermic, carbo-aluminothermic or alumino-thermic reaction, under vacuum or an inert atmosphere, of a glass or microcrystalline gel of oxide reactants prepared from organic alkoxide precursors. This glass or gel was then ground and formed into bodies and sintered into bodies of titanium diboride/alumina-based materials as components of aluminium production cells. But such sintered materials are subject to attack and grain-boundary corrosion when in contact with molten aluminium. Furthermore, the method was not suitable for producing large pieces such as blocks for use as cathodes in aluminium production cells.

The use of self-propagating combustion synthesis (also called micropyretic reaction) to produce net shaped ceramic electrodes for use in aluminium production has been described in WO 92/13977 and WO 92/22682, wherein a particulate combustion mixture for producing a ceramic or metal-ceramic composite was mixed with particulate fillers and inorganic binders. None of these materials contained carbon.

U.S. patent application Ser. No. 07/861,513, the contents whereof are incorporated herein by way of reference, proposed producing a protective refractory coating on a substrate of carbonaceous or other material as component in an aluminium production cell, by applying to the substrate a micropyretic reaction layer from a slurry containing particulate reactants in a colloidal carrier, and initiating a micropyretic reaction. The colloidal carrier was at least one of colloidal alumina, colloidal silica, colloidal yttria and colloidal monoaluminium phosphate.

U.S. patent application Ser. No. 07/897,726, the contents whereof are incorporated herein by way of reference, proposed a carbon containing paste for use in particular as components of electrolytic cells as such or compacted to form anodes, cathodes and cell linings of cells for the electrolysis of alumina for the production of aluminium in Hall-Héroult cells. The paste consisted essentially of a compact mixture of one or more particulate carbonaceous material(s) with a non-carbonaceous non-polluting binder and optionally with one or more fillers, the binder being a suspension of one or more colloids or being derived from one or more colloid precursors, colloid reagents or chelating agents.

To date, no carbon-based composite material containing a refractory hard metal boride, carbide or borocarbide has proven satisfactory for use as component of aluminium production cells. Such materials have been expensive to produce, and it has been difficult to produce the materials in large pieces serviceable in aluminium production cells. Moreover, the resistance of such materials to attack by melt components has been unsatisfactory.

SUMMARY OF THE INVENTION

It is, therefore, an object of the invention to produce a carbon-based composite material containing a refractory hard metal boride, carbide, oxide, nitride or combinations or mixtures thereof that are satisfactory for use as components of aluminium production cells, in particular as cell linings.

Another object of the invention to provide a method of economically producing such materials in large pieces that are serviceable in aluminium production cells and that have an excellent resistance to attack by melt components of aluminium production cells.

The invention provides a method of producing a component of an aluminium production cell made of a carbon-based composite material containing a refractory hard metal compound selected from borides, carbides, nitrides, oxides and combinations and mixtures thereof and at least one aluminium-based component selected from aluminium metal, aluminium alloys and aluminium compounds. Combinations of the aforesaid compound include borocarbides and oxycompounds such as oxynitrides.

The method according to the invention comprises firstly providing a reaction mixture of aluminium and precursors which react to form the refractory hard metal compound such as a boride, carbide or borocarbide or mixtures thereof, and optional fillers and additives. The reaction mixture is then mixed with particulate carbon in an amount of from 1 to 20 parts by weight of carbon for 1 part by weight of the reaction mixture; and with a colloidal binder containing at least one of colloidal silica, alumina, yttria, ceria, thoria, zirconia, magnesia, lithia, the amount of the colloidal binder being sufficient to fully wet the carbon particles. The resulting mixture is pressed or compacted into shape by other well known methods such as extrusion, and dried and heated to initiate reaction of the reaction mixture by a self-propagating micropyretic reaction which proceeds along a combustion front which sweeps through the shape.

The reaction product is particularly advantageous when used as cell side wall or lining of an aluminium production cell, on account of its good wettability by molten aluminium and its good oxidation resistance. The production method by self-propagating combustion synthesis or micropyretic reaction lends itself to making large blocks of the material or entire cell bottoms.

The reaction product is also particularly advantageous when used as cell side wall or lining of an aluminium production cell, on account of its high thermal conductivity and its good oxidation resistance.

DETAILED DESCRIPTION OF THE INVENTION

The reaction mixture is typically mixed with from 1.5 to 8 parts by weight of carbon for one part by weight of the reaction mixture, advantageously from 3 to 6 parts by weight of carbon for one part by weight of the reaction mixture. This reaction mixture and carbon are then mixed usually with from 0.1 ml to 1 ml of the colloidal binder per gram of the reaction mixture and carbon, and preferably with from 0.15 ml to 0.5 ml of the colloidal binder per gram of the reaction mixture.

The preferred reaction mixture comprises aluminium, boron oxide and titanium dioxide at least approximately in the molar ratio for the reaction scheme:

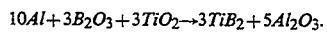
$$10Al + 3B_2O_3 + 3TiO_2 \rightarrow 3TiB_2 + 5Al_2O_3.$$

The colloidal binder, which is advantageously colloidal alumina, may be derived from colloid precursors or colloid reagents which are solutions of at least one salt such as chlorides, sulfates, nitrates, chlorates, perchlorates or metal organic compounds such as alkoxides, formates, acetates of silicon, aluminium, yttrium, cerium, thorium, zirconium, magnesium, lithium and other metals and mixtures thereof. The binder may contain a chelating agent such as acetyl acetone or ethylacetoacetate.

The aforementioned colloid precursor or reagent solutions of metal organic compounds are principally metal alkoxides of the general formula $M(OR)_z$ where M is a metal or complex cation, R is an alkyl chain and z is a number usually from 1 to 12.

The resulting carbon-based composite material usually contains at least 50% weight of carbon, and in most cases from 70 to 85% weight of carbon.

The starting material may comprise one or more fillers selected from metallic, intermetallic, semi-metallic, polymeric, refractory and/or pre-formed ceramic materials such as borides, carbides, nitrides, silicides, oxides, oxynitrides, as well as pyrolyzable chlorosilanes, polycarbosilanes, polysilanes and other organometallic polymers which pyrolyze to useful products for oxidation prevention or enhancing bonding, or their pyrolyzed products; thermosetting resins; thermoplastic resins; and mixtures thereof.

Examples of thermosetting resins are epoxides, phenolic resins and polyimides. Examples of thermoplastic resins are polycarbonates, e.g. Lexan TM, polyphenylene sulfides, polyether ether ketones, polysulfones, e.g. Udel TM, polyetherimides and polyethersulfones.

Some materials may be present both as binders and as fillers. For instance, alumina in colloidal form can be present in the binder, while particulate alumina may be included as a filler.

The particulate carbonaceous materials are preferably selected from petroleum coke, metallurgical coke, anthracite, graphite or any other form of crystalline carbons, amorphous carbon or a mixture thereof, usually anthracite, metallurgical coke, graphite and other carbon materials for the production of cathodes. Preferred materials are anthracite and graphite. Additionally, the carbon may be a fulerene such as fulerene $C_{60}$ or $C_{70}$ or of a related family. Mixtures of these different forms of carbon can also be used.

The size of the particulate carbonaceous material is usually below 40 mm, preferably between 1 micrometer and 30 mm, and the particulate carbonaceous material preferably contains between 5 weight % and 40 weight % of particles having a size below 0.2 mm.

However, the starting mixture of the invention may contain particulate carbonaceous material, fillers or binders that are fibrous, both discrete (chopped) fibers and continuous or discontinuous lengths of fibers. Fibers have the advantage of enhancing bonding and improving toughness, hence the solidity of the resulting bodies or masses. Mixtures of powders and fibers are also contemplated.

After making a block or mass, before serving as cell component, the block or mass may be subjected to an impregnation with a colloid based slurry and heated again. Such impregnation is preferably preceded by and followed by a heat treatment.

It is also possible to coat the block or mass with a coating of desired composition including, in particular for cathode applications, coatings of an aluminium wettable material such as titanium diboride or other refractory metal borides, carbides, nitrides etc., or to bond layers of such materials to the block or mass.

For carbon blocks or masses subject to oxidizing or corrosive environments, the coating may be a protective coating which improves the resistance of the body to oxidation, and which may also enhance the bodies electrical conductivity and/or its electrochemical activity, such coating being applied from a colloidal slurry containing reactant or non-reactant substances, or a mixture of reactant and non-reactant substances, which when the body is heated to a sufficient elevated temperature react and/or sitter to form the protective coating. Such coatings, which in preferred compositions comprise carbides, silicides, borides, nitrides, oxides, nitrides, carbonitrides, oxynitrides and combinations of these, in particular SiC and $MoSi_2$, possibly together with metallic particles such as for example Ni, Pt, Al, Cr or intermetallic particles such as for example NiAl, $NiAl_3$, CrSi, CrB etc. or combinations thereof, as well as the reaction products of micropyretic agents which are particles, fibers or foils of materials such as Ni, Al, Ti, B, Si, Nb, C, $Cr_2O_3$, Zr, Ta, $TiO_2$, $B_2O_3$..., Fe or combinations, are described in concurrently filed application Ser. No. 07/898,052 the contents of which are incorporated herein by way of reference.

Where enhanced wettability is required, it can be useful to bond tiles, plates slabs or other bodies of an aluminium-wettable RHM or an RHM composite material onto a carbon-based composite material according to the invention, using known bonding agents or an improved slurry as described in copending application entitled: "The Bonding of Bodies . . . " by Jainagesh A. Sekhar, the contents of which are incorporated herein by way of reference.

The invention will be further illustrated in the following examples.

EXAMPLE I

A combustion mixture was prepared by mixing 37.6 wt % aluminium powder (99.5 pure, −325 mesh), 29 wt % purified $B_2O_3$ (1 micron) and 33.4 wt % titanium dioxide (99+ pure grade, −300 mesh). An amount of 10.5 g of this combustion mixture was then mixed thoroughly with 19.5 g of anthracite powder (−80 mesh). An amount of 10.5 ml of a colloidal alumina binder (Grade WAL-12 from Messrs. Wesbond, containing 12 wt % colloids) were added to the mixture and stirred thoroughly so that all anthracite particles are wrapped with the slurry. During this mixing, the slurry warms. After waiting about 20 minutes for the slurry to cool, the mixture is pressed at 8000 psi in a die of 1 inch (2.54 cm) diameter to produce a cylinder. Soon after removal from the die, a micropyretic reaction is initated by quickly placing the cylinder in a furnace at 1150° C. for about 10 minutes. Immediately after reaction, the cylinder is immersed in carbon powder for about a half hour to prevent oxidation, then allowed to cool in air. The product after the micropyretic reaction Contained $TiB_2$, alumina and carbonaceous materials. In an electrolytic cell test with a $NaF/NaCl_2$ bath, the product worked well and did not disintegrate, whereas a conventional carbon cathode material completely disintegrated.

EXAMPLE II

A combustion mixture was prepared by mixing 26.3 wt % aluminium powder (99.5 pure, −325 mesh), 20.4 wt % purified $B_2O_3$ (1 micron), 23.35 wt % titanium dioxide (−300 mesh, 99+ pure grade), and 30 wt % anthracite (−80 mesh). An amount of 15 g of this combustion mixture was then mixed thoroughly with 15 g anthracite powder (−80 mesh). An amount of 7.5 ml of a colloidal alumina binder (Grade AL-20 from Nycol Products containing 30 wt % colloids) were added to the mixture and stirred thoroughly so that all anthracite particles are wrapped with the slurry. During this mixing, the slurry warms. After waiting about 15 minutes for the slurry to cool, the mixture is pressed at 1440-2500 psi in a die of 1 inch (2.54 cm) diameter to produce a cylinder. Micropyretic reaction is initated by quickly placing the cylinder in a furnace at 1100° C. for about 10 minutes. Immediately after reaction, the cylinder is immersed in carbon powder for about a half hour to prevent oxidation, then allowed to cool in air. The product after the micropyretic reaction contained $TiB_2$, alumina and carbonaceous materials. In an electrolytic cell test with a $NaF/NaCl_2$ molten bath, the product worked well and did not disintegrate, whereas a conventional carbon cathode material completely disintegrated.

EXAMPLE III

Example I was repeated but with air drying of the cylinder for 24 hours after removing the cylinder from the die and before placing it in the furnace. The result was similar.

EXAMPLE IV

Example I was repeated but using instead 19.5 g of graphite powder, −300 mesh. The result was similar.

I claim:

1. A component of an aluminium production cell made of a carbonaceous composite material:
    said composite material containing:
        a refractory hard metal compound selected from the group consisting of borides, carbides, oxides, nitrides, and combinations and mixtures thereof;
        at least one of aluminium, aluminium alloys and aluminium compound; and
        at least 50% by weight of particulate carbon wrapped in a dried colloidal binder containing at least one of colloidal silica, alumina, yttria, ceria, thoria, zirconia, magnesia, lithia; and
        said composite material obtained by micropyretic reaction along a combustion front through a mixture comprising a reaction mixture of aluminium and precursors which react to form the refractory hard metal compound, and optional fillers and additives, said particulate carbon present in an amount of from 1 to 20 parts for 1 part by weight of the reaction mixture, and said particulate carbon being wetted by said colloidal binder prior to said micropyretic reaction.

2. The cell component of claim 1, wherein the composite material comprises titanium diboride, alumina, and particulate carbon.

3. The cell component of claim 1, wherein the composite material contains 70 to 85% weight of carbon.

4. The cell component of claim 1, wherein the carbonaceous composite material is coated with a coating or covered with a bonded layer of an aluminium-wettable refractory material 5. An aluminium production cell comprising a component according to claim 1, which component is a cell bottom, a cell lining or a cell bottom and a cell lining.

* * * * *

UNITED STATES PATENT AND TRADEMARK OFFICE
CERTIFICATE OF CORRECTION

PATENT NO. : 5,374,342
DATED : December 20, 1994
INVENTOR(S) : Jainagesh A. Sekhar It is certified that error appears in the above-identified patent and that said Letters Patent is hereby corrected as shown below:

Column 8, line 19, (claim 4) after the word "material" please add --.--

Signed and Sealed this

Thirtieth Day of May, 1995

Attest:

BRUCE LEHMAN

*Attesting Officer*    *Commissioner of Patents and Trademarks*